F. V. JOHNSON.
TRACTOR.
APPLICATION FILED APR. 22, 1918.
1,310,417.
Patented July 22, 1919.
4 SHEETS—SHEET 3.
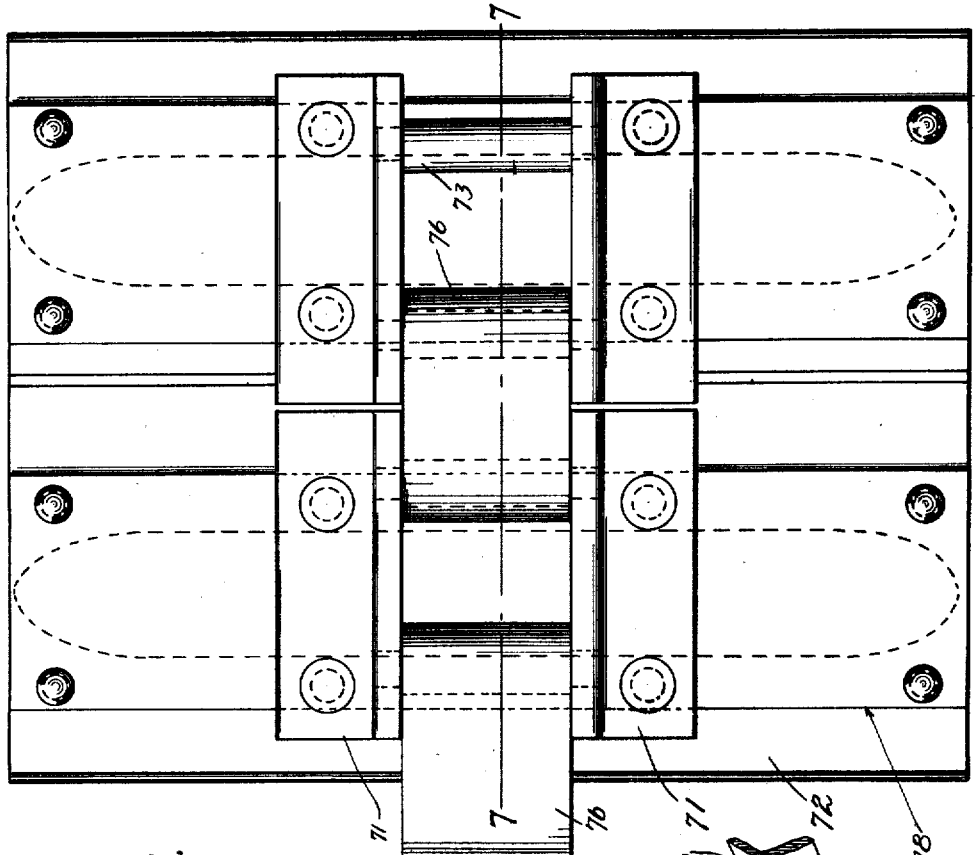
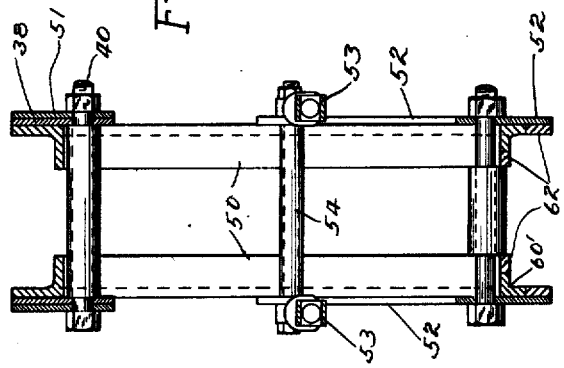
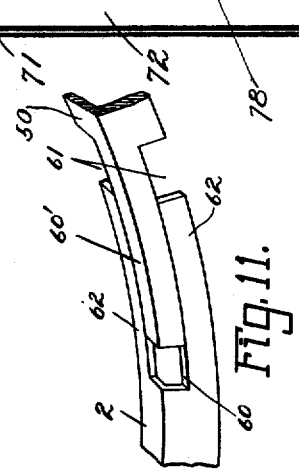
Inventor
Fred V. Johnson
By *H. A. Stock*
Attorney

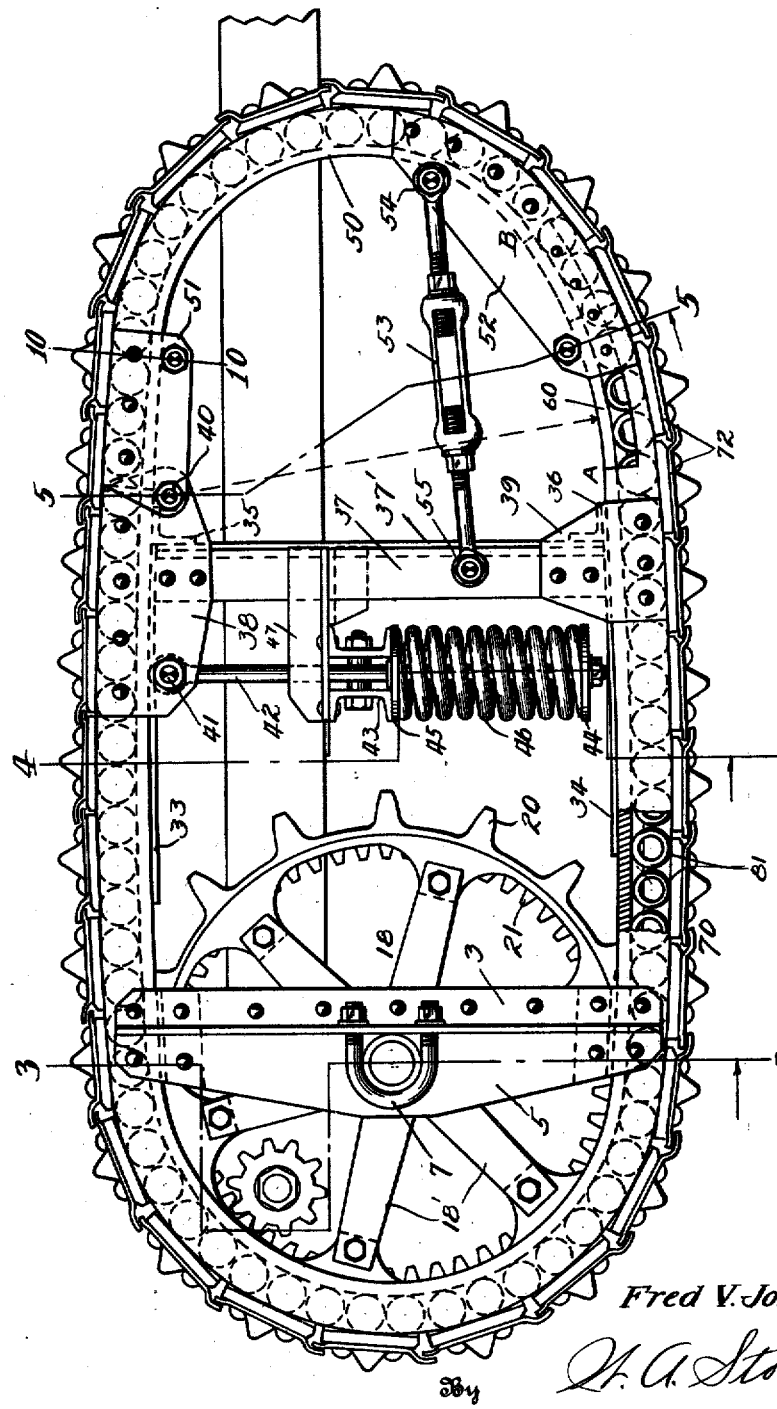

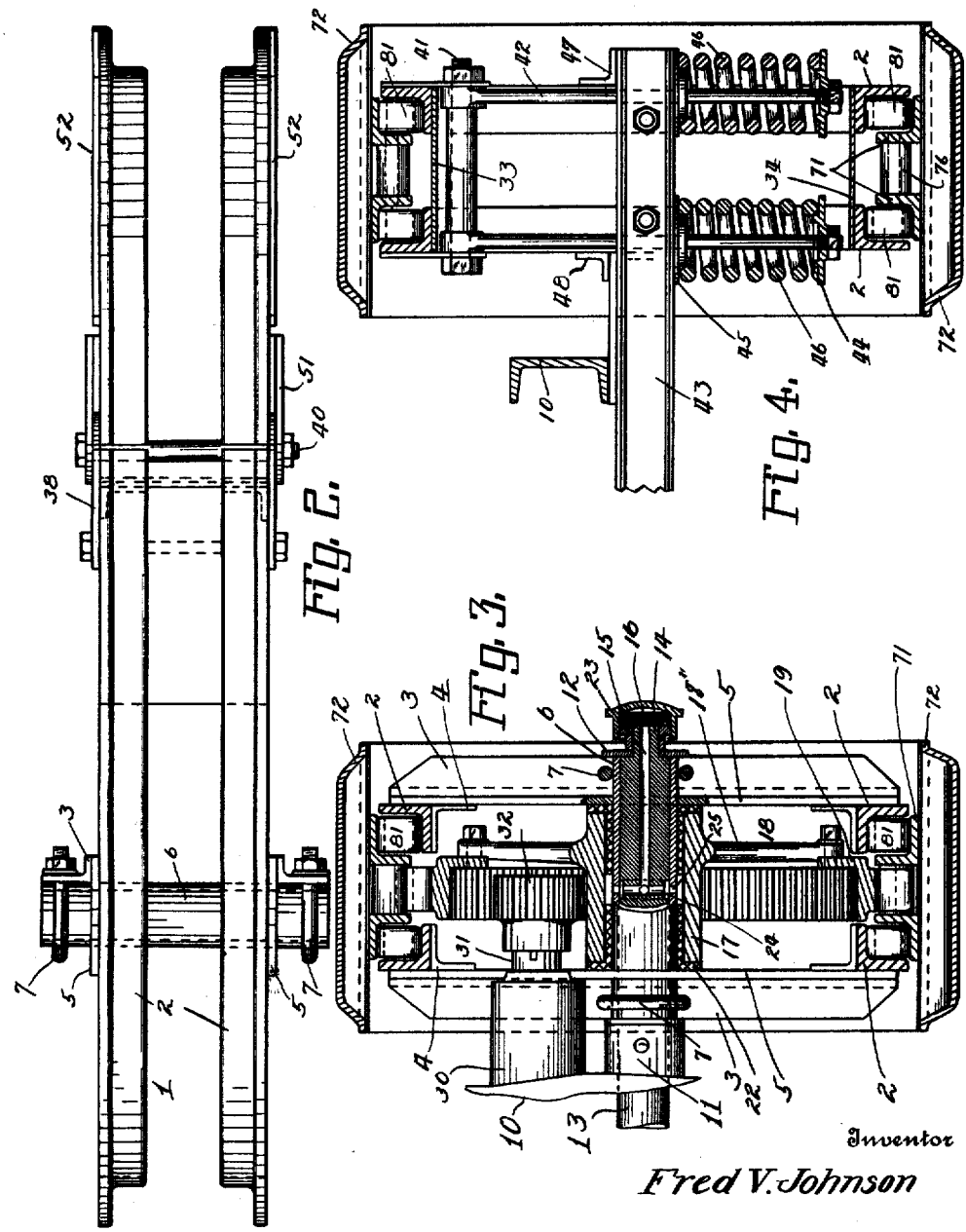

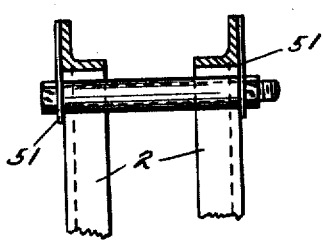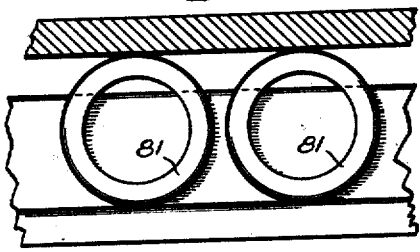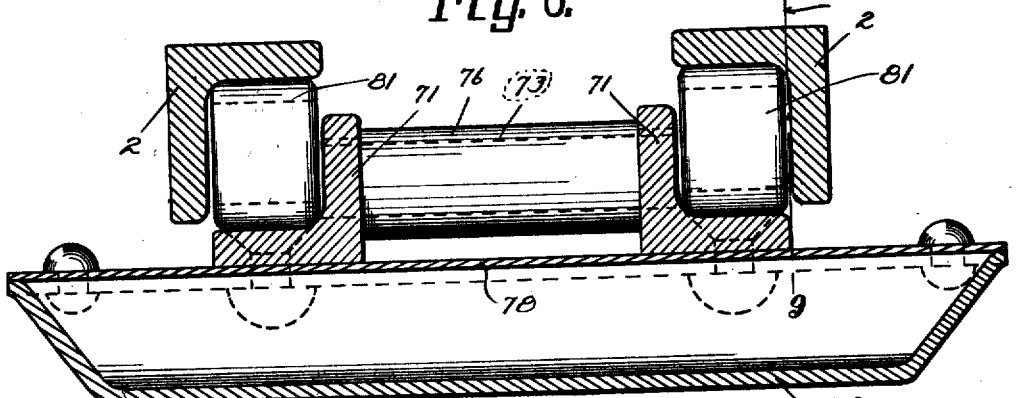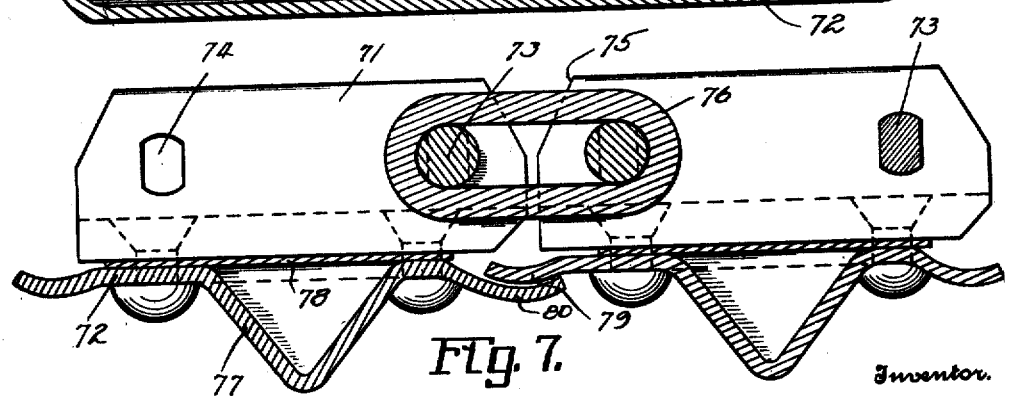

UNITED STATES PATENT OFFICE.

FRED V. JOHNSON, OF BERKELEY, CALIFORNIA.

TRACTOR.

1,310,417.　　　　Specification of Letters Patent.　　Patented July 22, 1919.

Application filed April 22, 1918. Serial No. 237,149.

*To all whom it may concern:*

Be it known that I, FRED V. JOHNSON, a citizen of the United States, residing at Berkeley, in the county of Alameda and State of California, have invented certain new and useful Improvements in Tractors, of which the following is a specification.

My invention relates to improvements in tractors of the track-laying type and more particularly to improvements in the track-laying units. In my tractor, as in the conventional construction, one of these units is mounted on each side of the tractor body and the units are driven by an engine and suitable transmission mechanism on the body.

The principal object of my present invention is to provide improved means for supporting the movable track which means combine simplicity of construction and efficiency of operation. Another object of the invention is to provide a track-laying unit of this character in which the entire length on the under side of the unit is effective in supporting the weight of the machine, and a further object is to provide a connection between the track-laying unit and the frame of the tractor body whereby the unit is capable of considerable movement with reference to the frame, that in going over uneven surfaces the units may conform to the contour thereof.

A further object of my invention is to mount the movable track members on suitable anti-friction rollers and to provide means for changing the length of the roller raceways as wear takes place between the connecting links of the track shoes. A still further object is to so construct the rollers and their raceways that they form substantially anti-friction means for taking care of lateral stresses as well as the regular vertical stresses.

With these and other objects in view, the invention consists of certain novel features of construction, combinations and arrangement of parts hereinafter described and more specifically pointed out in the appended claims; it being understood that changes in form, proportion, size and minor details of construction within the scope of the claims may be resorted to without departing from the spirit of the invention or sacrificing any of the advantages thereof.

Reference being had to the accompanying drawings forming a part of the specification, Figure 1, is a view in side elevation of my improved track-laying unit showing also a portion of the tractor frame to which the unit is attached.

Fig. 2, is a view in plan of the substantially elliptical track supporting frame.

Fig. 3, is a cross section of the track-laying unit taken on the line, 3—3, Fig. 1.

Fig. 4, is a cross section of the unit taken on the line 4—4, Fig. 1.

Fig. 5, is a cross section of the frame shown in Fig. 2 but taken on the line 5—5, Fig. 1.

Fig. 6, is a view in plan of a pair of track sections showing the supporting shoes attached thereto.

Fig. 7, is a sectional view of the track sections taken on line 7—7, Fig. 6.

Fig. 8, is an enlarged transverse sectional view through the track frame, track sections and supporting shoes.

Fig. 9, is a fragmentary view of the raceway and the rollers therein.

Fig. 10, is a cross section on line 10—10, Fig. 1.

Fig. 11, is a fragmentary view in perspective showing the telescopic joint between the portions of the track frame.

Referring to corresponding parts of the several views by the same numerals of reference, 1 indicates a substantially elliptical frame which may be constructed of parallel angle-shaped members 2.

Extending across one end of this frame on both sides thereof are struts composed of the angle members 3 and the flat plates 5. These struts, at their upper and lower ends, are riveted to the trackway members 2 and are further connected thereto by means of the angles 4.

Openings are provided through the plate 5 adjacent the center thereof and through this opening extends an axle sleeve 6 which is held in place by means of the U bolts 7 the ends of which pass through the flanges of angles 3 and clamp the sleeve against the same flanges of the angles.

A portion of the tractor body is indicated at 10 and extending laterally therefrom is a hub 11 in which is held an axle 13. This axle is non-revolubly held in the tractor frame and extends through the axle sleeve 6, the outer end being reduced in diameter and threaded as shown at 14. Collars 12 fit over the axle at the ends of sleeve 16 and rest against the edges of the vertical struts 3. Engaging the threaded portion 14 of the axle is a nut 15 which holds the outer collar in position and also forms a portion of the grease cup 16.

Extending axially from the end of axle 13 is an oil passageway 23 which terminates under the center of the hub 17 and is there provided with lateral passageways which communicate with an annular groove 24 in the surface of the axle. The axle sleeve 6 is provided with openings 25 which communicate with the space between the inner ends of bushings 22 and the groove 24 thus providing a continuous oil conduit from the grease cup 16 to the bearing surfaces of the bushings 22.

A driving wheel 18 is provided which consists of the hub portion 17 connected to the annulus 19 by means of a web or spokes 18'. I prefer to make this annulus detachable from the center portion of the wheel that it may be renewed as the teeth on the annulus become worn. On the outer surface of the annulus are formed sprocket teeth 20 and on the inner surface is formed the internally toothed gear 21. The hub 17 has removable bushings 22 that are journaled on the outside of sleeve 6 and their inner ends are spaced apart to provide an oil chamber.

On the tractor frame is also provided a journal 30 in which is revolubly mounted a pinion shaft 31 that is driven by a suitable engine mounted on the tractor frame and which it is not deemed necessary to illustrate.

The shaft 31 extends within the track frame 1 and keyed thereon is a toothed pinion 32 which meshes with the internally toothed gear 21 thus causing the rotation of the drive wheel on the axle sleeve 6.

Plates 33 and 34 extend across and are riveted to the parallel trackway members 2 about midway between the ends of the frame and forward of these plates are angle cross bars 35 and 36 which connect the horizontal flanges of the trackway members 2. Vertical angle-shaped iron struts 37 are attached at their upper and lower ends to gusset plates 38 and 39 and to the side edges of a rectangular plate 37' the top and bottom edges of which are attached to cross angles 35 and 36.

A pin or bolt 41 extends transversely of the frame through the plates 38 and on this pin is pivotally mounted a rod 42. This rod extends downwardly between the beams 43. The latter are secured to the tractor frame 10 and extend laterally therefrom into the tracklaying unit. Secured on the bottom of the rod is a collar 44 and just under the beams 43 is a similar collar 45, these collars serving to center and form abutments for a heavy coil spring 46 which is interposed therebetween.

On the outer end of beam 43 is secured a guide bar 47 which contacts with the outside of the outer strut 37 and on the inside of the frame a similar guide bar 48 is secured to the beam 43 which contacts with the inner surface of the inner strut 37. these bars serving as guides for the vertical movement of the track-laying unit.

The frame 1 comprises two parts, the part 50 on the end of the frame opposite the sprocket wheel being pivotally attached to the main part at one end and provided with a telescoping joint where the opposite ends meet. The upper frame members of the portion 50 have plates 51 riveted on the outside thereof which plates overlap the gusset plates 38 and are pivotally attached thereto as shown at 40.

The lower trackway members of the main part of the frame adjacent the hinged part 50, have the horizontal and vertical flanges slotted as shown at 60 thus forming tongues 62 on the outer edge of each flange. The adjacent ends of the trackway members of the part 50 are slotted on the edges of the flanges as shown at 61 forming a tongue 60', the width of these slots being equal to that of the tongues 62 and tongue 60' fitting slot 60. Furthermore, the lower ends of the trackway members 2 and the adjacent ends of the part 50 are curved on a radius between the points A and B, this radius having its center in the axis of the pivotal point 40. By this construction the ends of portion 50 may telescope into the ends of the main trackway thus varying the peripheral length of the trackway as a whole.

To the outside of the angles composing the trackway 50 are riveted plates 52 these plates being held in spaced relation by means of bolts, spacing bars, or other suitable means. To one of these spacing members, as 54, is pivotally attached a turn-buckle 53, the opposite end of which is pivotally attached to the strut 37 as shown at 55.

An endless flexible track 70 extends around the frame previously described and is composed of a plurality of members each of which consists of two parallel tread members 71 which are angular in cross section and which, in connection with the trackway angles 2, form raceways for the rollers 81.

These tread members are connected by links 76 which are pivotally mounted on pins 73 which extend between the vertical flanges of the tread members. These pins are cylindrical in section except the ends which extend into the openings 74 which are polysided so that the pins will not turn in the tread members. The connecting links 16 have rounded ends which are engaged by the sprocket teeth 20.

The inner corners of the tread members 71 are cut off at an angle as shown at 75 to permit the adjacent sections to assume an angle in relation to each other.

The track shoes consist of a flat plate 72 in which are formed hollow transverse grousers 77 and the opposite ends of each shoe are curved as shown at 79 and 80, the radius of these curves being in a line midway between the pins 73 of adjacent links. To prevent entrance of dirt into the grousers, I provide a plate 78 between the tread members and shoes 77.

In operation the rotation of the pinion shaft 31 causes pinion 32 to rotate the driving wheel 18 on axle sleeve 6 and the teeth 20 to engage the rounded ends of links 76 and roll along the track. This causes a forward movement of the elliptical frame in reference to the track in contact with the ground, or what is to the same relative effect, the track moves around the frame 1 thus operating as a track-laying unit.

The weight of the tractor is transmitted to the track-laying unit partly through axle 13 and partly through the beams 43 and it will be apparent that by means of the novel mounting employed in connection with my track-laying units, if one of these units strike an obstruction this unit may pivot about the axle and assume an angle relative to the main frame 10 without affecting the latter or without any change in the relative position of the track-laying unit on the opposite side.

As the machine is used the pins 73 and the link 76 may become worn increasing the length of the track. This increase may be compensated for in the trackway frame by means of the turn-buckles 53, which, as the track lengthens, may be turned to adjust the length of the trackway frame.

The angular trackway members 2 and the tread members 71, as previously stated, are L-shaped and the angles disposed to form parallel, substantially rectangular raceways. In practice the corner between the inside faces of the adjacent flanges is provided with a fillet of good radius and the corners of the rollers are likewise rounded on a slightly smaller radius. The width of the rollers is slightly less than the raceway and the rounded corners of the raceways form abutments which are engaged by the slightly less rounded corners of the rollers. This prevents contact between the side surfaces of the rollers and the trackway members. Furthermore, as the angle-shaped trackway members and the tread members are disposed in diagonal relation, these rounded corners serve to take care of side stresses. Thus, as in side hill work the elliptical frame exerts a side thrust against the flexible track and the greater part of this thrust is transmitted with little friction through the rounded corners of the tread members and the trackway.

I prefer to make the rollers annular in shape as the transverse openings serve to more effectively distribute the lubricant around the trackway.

I claim as new and wish to cover by Letters Patent:—

1. An apparatus of the character described, an endless flexible track comprised of track shoes, parallel tread members attached to said shoes, links pivotally connecting the ends of adjacent tread members and arcuate overlapping ends on said shoes, said arcuate ends being curved on a radius whose center is midway between the axes of said connecting links.

2. An apparatus of the character described, an endless flexible track composed of track shoes, parallel angle-shaped tread members attached to said shoes, pivot pins extending between said tread members at each end thereof, connecting links pivotally mounted on the pins of adjacent links, and overlapping ends on said shoes curved on a radius whose center is midway between the ends of said connecting links.

3. An apparatus of the character described, an endless flexible track composed of track shoes, parallel angle-shaped tread members attached to said shoes and forming movable raceways, pivot pins connecting the ends of the tread members on each shoe, and links pivotally mounted on said pins to connect the adjacent tread members.

4. A device of the character described comprising a substantially elliptical trackway frame having parallel opposed raceways, an endless flexible track adapted to move about said frame, composed of track shoes, parallel angle-shaped tread members attached to said shoes and forming movable raceways for coöperation with the raceways of said trackway frame, pivot pins connecting the ends of the tread members on each shoe, links pivotally mounted on said pins to connect the adjacent tread members and attached shoes, and cylindrical rollers adapted to travel in said raceways.

5. A tractor comprising in combination with a tractor frame, a track-laying unit comprising an elliptical track frame having parallel roller raceways, struts adjacent each end of said frame connecting the top and bottom portions thereof, a tubular sleeve detachably connected to the struts at one end of said frame, a non-rotating axle extending from said tractor frame through said sleeve to pivotally mount said tracklaying unit thereon, a beam extending from said tractor frame adjacent the other of said struts, a yieldable spring support interposed between said beam and said track frame, and guide bars extending from said beam and embracing said strut adjacent thereto.

6. A tractor comprising a trackway frame having parallel endless roller raceways, an endless flexible track having coöperating raceways extending around said frame, said frame being composed of two pivotally connected members, one of the unconnected ends of said members having a longitudinal slot formed therein, and a tongue formed on the adjacent end of the other of said members, said unconnected ends being curved on a radius, the center of which is the axis of the opposite pivotally connected end, said ends being slidable on each other to maintain continuity of said raceways.

7. A tractor comprising an elliptical trackway frame, an endless flexible track surrounding said frame said track comprising a plurality of sections each consisting of a track shoe, parallel angle-shaped tread members attached to said shoe, pins nonturnably fixed in the ends of said members, and connecting links pivotally mounted on said pins of adjacent tread members.

8. An endless flexible tractor track comprising a plurality of track sections each section comprising a track shoe, parallel tread members attached to said shoe, the horizontal flanges of said members extending from the vertical flanges in opposite directions, pins near each end of said members non-revolubly fixed in vertical flanges of said members, connecting links pivotally mounted on said pins, and overlapping ends on said track shoes bent on a curve, the center of which is equally distant from the axis of the adjacent pivot pins.

9. An endless track of the character described comprising overlapping track shoes, oppositely disposed angle-shaped tread members attached to said shoes to form substantially continuous roller raceways, pivot pins extending between said tread members at each end thereof, and connecting links pivotally mounted on the said pins of adjacent tread members.

10. A track-laying unit for tractors comprising a trackway frame having opposed endless roller raceways, a plurality of track sections forming an endless flexible track, track sections composed of track shoes, abutting tread members attached to said shoes and having roller raceways adapted to coöperate with said opposed raceways, links pivotally attached to the ends of said tread members to connect said track sections, and cylindrical rollers adapted to travel in said raceways.

11. A device of the character described, a frame formed of parallel oppositely disposed angle-shaped trackway members, an endless flexible track movable about said frame comprising angle-shaped abutting tread members, said tread members coöperating with said trackway members to form roller raceways, free cylindrical rollers having rounded edges movable in said raceways, and curved surfaces in diagonal corners of said coöperating raceways for contacting with the rounded edges of said rollers.

12. A device of the character described, a track frame formed of parallel angle-shaped raceway members forming opposed endless raceways, an endless flexible track movable about said frame comprising angle-shaped tread members, links pivotally attached to said tread members adjacent the ends thereof and connecting adjacent tread members, the ends of said tread members substantially abutting against the adjacent tread members and forming raceways adapted to coöperate with said frame raceways, free cylindrical rollers in said raceways, and abutments in diagonally opposite corners of said raceways to prevent contact between the side surface of said rollers and said raceways.

13. A device of the character described, a track frame formed of parallel angle-shaped trackway members forming opposed endless raceways, an endless flexible track movable about said frame comprising angle-shaped abutting tread members forming raceways adapted to coöperate with said frame raceways, links pivotally attached to said tread members and connecting adjacent tread members, free cylindrical rollers having rounded edges movable in said raceways, and curved surfaces in diagonal corners of said coöperating raceways having radii greater than that of the coöperating rounded edges of said rollers.

14. A traction device of the character described comprising a track frame having endless roller raceways, an endless flexible track movable about said frame and having coöperating raceways, said frame being composed of two pivotally connected sections, telescoping tongues formed on the adjacent unconnected ends of said sections, said tongues being on an arc whose center is in the axis of the pivotal connection between the said sections, and means for adjusting and holding rigid the sections with respect to each other.

15. In a tractor the combination with a tractor frame, a track-laying unit comprising an elliptical track frame having parallel roller raceways, an endless flexible track movable about said frame and comprising angle-shaped tread members having coöperating raceways, cylindrical rollers in said raceways, links pivotally attached to opposite ends of said tread members and connecting adjacent tread members, struts adjacent each end of said frame connecting the top and bottom portions thereof, a tubular sleeve attached to one of said struts, a non-rotating axle extending from said tractor frame through said sleeve to pivotally mount the tracklaying unit thereon, a toothed sprocket revolubly mounted on the outside of said sleeve the teeth of said sprocket coöperating with said connecting links for the purpose of driving said flexible track, a beam extending from said tractor frame adjacent the other of said struts, a yieldable spring support interposed between said beam and said track frame, and guide bars extending laterally from said beam and embracing the strut adjacent thereto.

In testimony whereof I affix my signature.

FRED V. JOHNSON.

Copies of this patent may be obtained for five cents each, by addressing the "Commissioner of Patents, Washington, D. C."